Dec. 20, 1966   M. H. GROVE   3,293,342
METHOD FOR MANUFACTURE OF VALVE SEALING MEANS
Filed Sept. 23, 1963   3 Sheets-Sheet 1

INVENTOR.
MARVIN H. GROVE
BY
Flehr and Swain
ATTORNEYS

Dec. 20, 1966    M. H. GROVE    3,293,342
METHOD FOR MANUFACTURE OF VALVE SEALING MEANS
Filed Sept. 23, 1963    3 Sheets-Sheet 2

INVENTOR.
MARVIN H. GROVE
BY
*Flehr and Swain*
ATTORNEYS

Dec. 20, 1966    M. H. GROVE    3,293,342
METHOD FOR MANUFACTURE OF VALVE SEALING MEANS
Filed Sept. 23, 1963    3 Sheets-Sheet 3

INVENTOR.
MARVIN H. GROVE
BY
*Flehr and Swain*
ATTORNEYS

United States Patent Office 3,293,342
Patented Dec. 20, 1966

3,293,342
METHOD FOR MANUFACTURE OF VALVE
SEALING MEANS
Marvin H. Grove, 340 Hillside Ave.,
Piedmont, Calif. 94611
Filed Sept. 23, 1963, Ser. No. 310,640
6 Claims. (Cl. 264—157)

This application is a continuation-in-part of my application Ser. No. 237,056, filed November 13, 1962, entitled Valve Construction and Method of Manufacture, now abandoned, and application Serial No. 253,416, filed January 23, 1963, entitled Valve Construction, now abandoned in favor of application Ser. No. 453,403, filed May 5, 1965, for Valve Construction and Method of Manufacture.

This invention relates generally to methods for the manufacture of sealing assemblies such as are used in the manufacture of fluid control valves.

In my copending application Ser. No. 453,403, I have shown a valve sealing assembly which incorporates the desirable properties of both relatively hard resilient materials like nylon, and resilient materials that are relatively soft. More particularly, the assembly includes a seal ring made of nylon which has an insert of softer resilient material for contacting the working surfaces of the valve to maintain a seal.

In general it is an object of the invention to provide a novel method for the manufacture of sealing means as disclosed in my said application Ser. No. 453,403.

Another object of the invention is to provide a method of the above character which avoids use of conventional molds.

Additional objects and features of the invention will appear from the following description in which the preferred embodiments have been set forth in detail in conjunction with the accompanying drawing.

Figure 1:
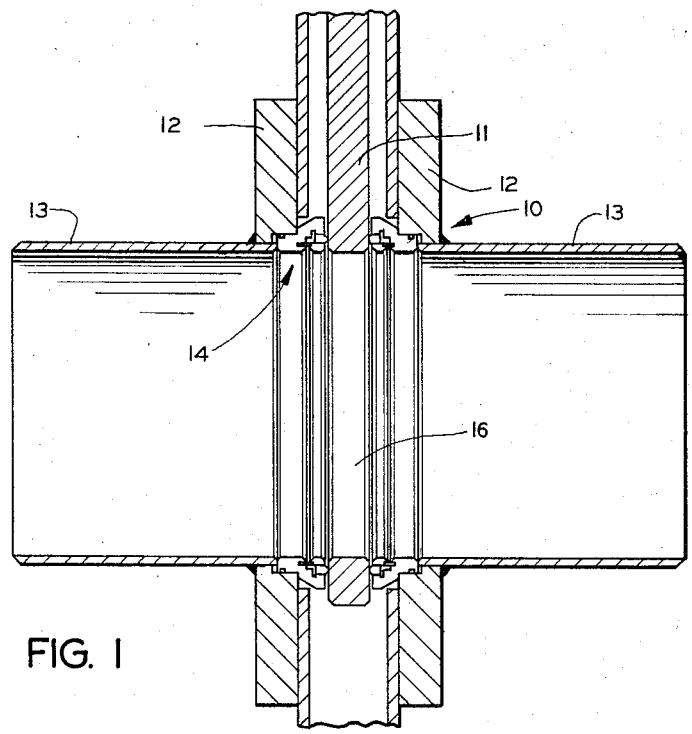
FIGURE 1 is a side elevational view in section illustrating a valve as disclosed in my said application Ser. No. 453,403.

The valve illustrated in FIGURE 1 is of the gate type and consists of the body 10 together with the movable gate 11. While the body may be made in various ways, in this particular instance it is shown as being fabricated from metal plates. The side walls 12 of the body are machined to receive the welded-in hubs 13. The gate 11 normally is connected to an operating rod (not shown) which extends to the exterior through a suitable bonnet (not shown).

The operating means (not shown) which is connected to the operating rod, may be any one of several types, such as handwheel means, gear means, or remote controlled operators of the pneumatic, hydraulic or electrical type.

Interposed between the inner end portions of the hubs and the gate 11 are the annular sealing assemblies 14. As will be presently explained these assemblies are sealed with respect to the body, and they have sealing contact with the side valve working surfaces of the gate 11.

While the gate 11 may vary in different instances, in the example illustrated it is a flat plate provided with a port 16 which registers with the flow passages through the hubs 13, for open position of the valve.

Figure 2:
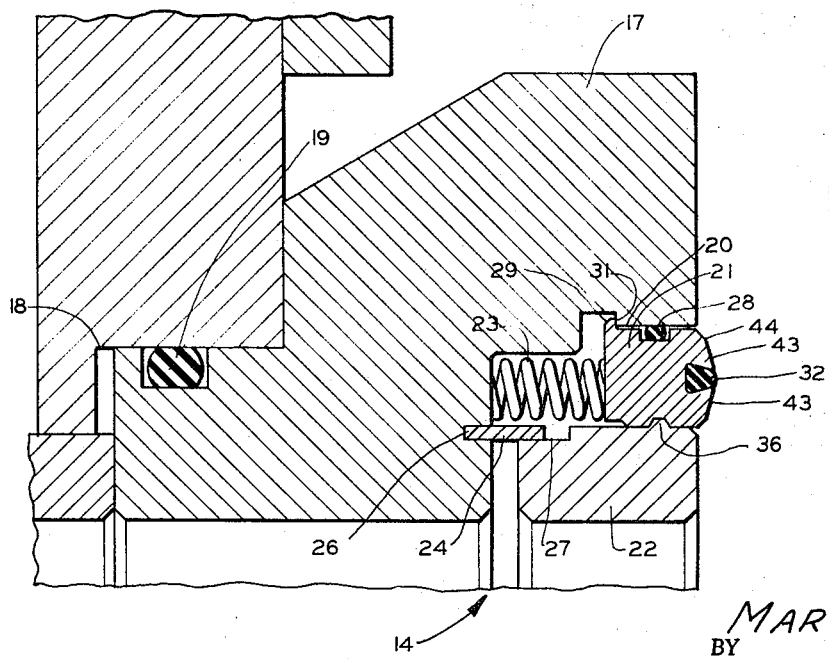
FIGURE 2 is a detail in section, on an enlarged scale, illustrating one of the sealing assemblies incorporated in FIGURE 1.

The construction of each of the assemblies 14 is shown in FIGURE 2. It consists of a mounting ring 17 which has one end portion machined to interfit a machined bore 18 in the valve body. Leakage between these interfitting portions is prevented by the seal ring 19 of the resilient O-ring type. The other end portion of the mounting ring 17 is provided with a bore 20 that accommodates the resilient seal member 21. In this embodiment member 21 is mounted upon the carrier ring 22. It is made of a relatively hard wear resisting material, such as nylon. A plurality of circumferentially spaced coiled compression springs 23 engage the inner end of the seal member 21, thus urging it toward the right as viewed in FIGURE 2. A sediment guard 24 is shown extending between the mounting ring and the carrier ring 22. This guard can be in the form of a split ring which is inserted in an annular recess 26 of the mounting ring, and which slidably overlaps a cylindrical surface 27 on the adjacent portion of the carrier ring.

The annular seal member 21 is sealed with respect to the mounting ring by the sealing member 28 of the O-ring type. The seal member 21 is retained in the position illustrated in FIGURE 2 by a projecting flange or lip 29, which engages the shoulder 31 on the mounting ring.

That end of the seal member which contacts the adjacent gate is provided with an annular insert 32, which as will be presently explained is made of a resilient material relatively softer than the material used for making the seal member 21.

Figure 3:
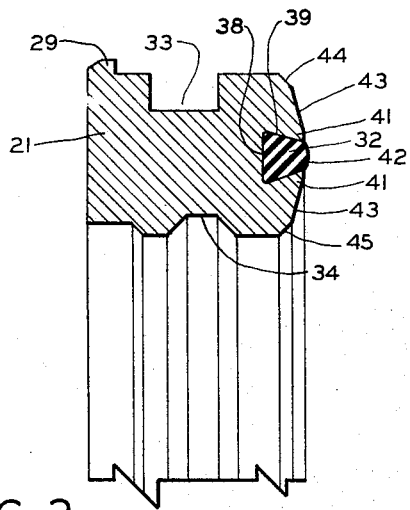
FIGURE 3 is a side elevational view in section illustrating the composite seal member incorporated in the assembly of FIGURE 2.

The seal member 21 is shown by itself in FIGURE 3. Note that its outer periphery is provided with a groove or recess 33 for accommodating the resilient O-ring 28. Its inner periphery is provided with a groove 34, adapted to interfit a rib 36 on the outer periphery of the carrier ring 22.

The preferred configuration of the end portion of the seal ring, which contacts the adjacent gate, is as follows. The resilient insert 32 is disposed within a circumferential recess formed in one end of the ring and defined by the bottom surface 38, and the side surface 39. Reference to an end portion of the ring refers to the portion that contacts the gate. It may be described as that portion of the ring on that side which contacts the gate. Note that the surfaces 39 are inclined with respect to each other, whereby they are convergent toward the end of the seal member. This serves to provide lip-like portions 41, adjacent both the outer and inner peripheries of the insert 32. The exterior surface 42 of the insert 32 may normally be slightly bulged as indicated in FIGURE 3, but is flat when pressed in contact with the valve working surface. The exterior faces 43 of the lip portions 41 are cut away substantially as illustrated in FIGURE 3, whereby in section the angle made by these surfaces with respect to the plane of an adjacent valve working surface may for example be of the order of 15 degrees. The outer and inner corners are shown beveled as indicated at 44 and 45. It will also be noted that the surfaces 43 in the finished seal member are such that when this end of the seal member is contacted with a valve working surface which conforms to a plane, the initial contact is with the surface 42 of the resilient insert, and thereafter as this surface is slightly compressed, contact is established with the lip portions 41. In other words, the surfaces 43 adjacent the insert 32 are somewhat relieved with respect to the uncompressed exterior surface 42 of the insert.

Figure 4:
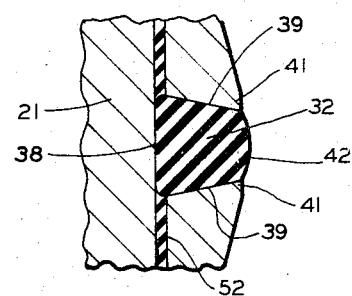
FIGURE 4 is an enlarged detail in section showing one end of the seal member shown in FIGURE 3.
Figure 5:
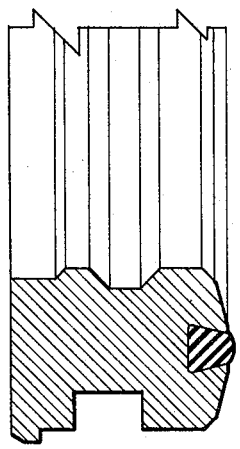
FIGURE 5 is a view like FIGURE 4, but showing the seal member in contact with the valve working surface of a valve part, such as a valve gate.
Figure 5:
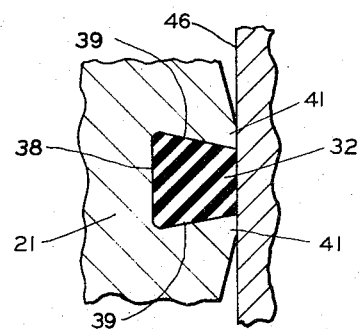

The construction described above is illustrated in enlarged detail in FIGURE 4. Note the slight extension of surface 42 with respect to the adjacent faces of the lip portions 41. FIGURE 5 illustrates what happens when the seal member is applied to the valve working surface 46 of a gate. As pointed out above, the initial force with which the seal member is urged against the gate, which is by virtue of the compression springs 23, serves to compress the insert 32 sufficiently to directly contact the lip portions 41 with the gate. As the force with which the seal member is urged against the gate increases, such force serves to bend or deflect the lip portions 41 against the insert 32, thus increasinng the pressure upon this insert, and thereby increasing the bearing pressure between the insert surface 42, and the valve working surface. This squeezing or compressing action is conducive to maintaining a good fluid tight seal between the resilient rubber insert and the valve working surface. At the same time the soft resilient insert is capable of withstanding relatively high fluid pressures because it is carried within the harder resilient material.

In general the seal described above possesses some of the attributes of both hard and relatively soft resilient materials. In normal operations, with the soft resilient insert squeezed and pressed into contact with the valve working surface, a good fluid type seal is established, even though the valve working surface may be finished with a surface which normally might not give a fluid tight seal with material like nylon. In addition, the soft resilient material establishes a seal irrespective of the presence of foreign material, and it has a desirable wiping action upon the valve working surface, when the gate is moved. As the gate is being moved between open and closed positions, a portion of the length of the seal member is out of contact with the valve working surface. For such portion of the seal member, the squeezinng action upon the insert is relaxed. However, when the gate is returned to full open or closed positions, the squeezing action is reestablished as described above.

In the complete assembly 14, it will be evident that the insert 32 establishes a seal on a diameter which is somewhat smaller than the diameter of the bore 20, with which the O-ring 28 establishes sealing contact. Therefore, upon the upstream side of the valve, a fluid pressure area is presented to cause differential line pressure to urge the seal member 21 against the gate. Under such conditions the force with which the member 21 is urged against the gate is dependent upon both the thrust of the springs 23, and the differential line pressure.

When the valve is assembled each of the seal members 21 is forced inwardly a limited amount with respect to its mounting ring 17. The dimensions are such that some clearance exists between the sides of the gate and the end faces of the mounting ring 17. When the gate is closed it is urged by line pressure toward the downstream side, thus forcing the downstream seal member to substantially the limit of its movement. At such time the flange 29 upon the upstream side will be nearly in contact with the retaining shoulder 31. Assuming that it is desired to maintain a downstream seal, then the dimensions can be such that the thrust of the gate upon the downstream seal member provides sufficient force between the seal member and the gate to maintain the desired seal.

As pointed out above, the purpose of the flange or lip 29 is to retain the seal member within its mounting ring. At the time the seal member 21 is assembled within the mounting ring 17, it is forced into bore 20 and thereby deformed a sufficient amount to permit the flange 29 to pass through the bore 20. When the seal member has been forced sufficiently far into the bore 20, the flange 29 snaps into the position shown in FIGURE 2.

The carrier ring 22 strengthens and aids in maintaining the seal member 21 in its desired form. Preferably it has a relatively tight fit within the seal member. This can be obtained by immersing the seal member 21 in boiling water before it is forced over the carrier ring 22. Thereafter as the seal member cools, a tight shrunk fit is established.

A further purpose of the carrier ring 22 is to establish an approximate secondary seal or barrier in the event the seal member 21 is destroyed, as by fire.

Figure 6:
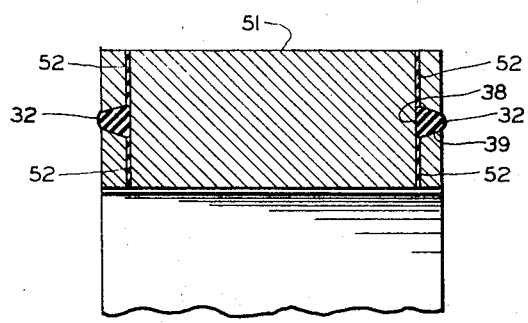
FIGURE 6 is a side elevational view in section illustrating an annulus made of material like nylon, being prepared for manufacturing two seal members of the type shown in FIGURE 3.

FIGURES 6–11 illustrate my novel method for manufacturing the seal member 21. As shown in FIGURE 6 an annulus 51 is provided, which is in the form of a section of a tube. It can be cut from tube stock, or molded. Nylon is a suitable material because of its physical characteristics, which permit subsequent machining, and which makes it suitable for use as a seal member. The member 51 is dimensioned whereby after certain operations to be described, it forms two separate sealing members 21. The two recesses 38, in the same form as shown in FIGURE 3, are made in the ends of the member 51 by suitable machining. In addition, a plurality of small circumferentially spaced holes 52 are provided. These holes communicate between the inner corners of the recesses 38 and the outer and inner peripheries of the member 51.

Figure 7:
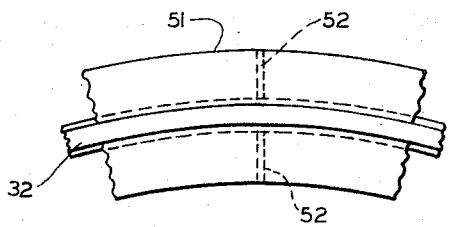
FIGURE 7 is an end view of the member shown in FIGURE 6.
Figure 8:
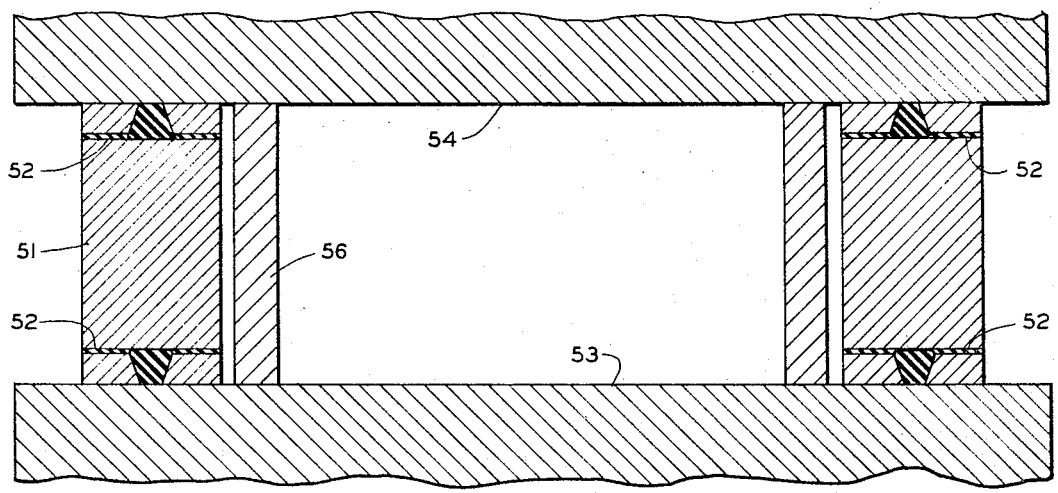
FIGURE 8 is a side elevational view in section illustrating the procedure for molding and curing the softer resilient material.

After forming the member 51 as shown in FIGURES 6 and 7, a suitable resilient material, like synthetic rubber, is molded into the recesses 38. The molding operation is carried out as shown in FIGURE 8. In this instance I employ a pair of heated platens 53 and 54, which are carried by suitable means whereby they can be moved together or apart. After introducing suitable stock into the recesses 38, the member 51 is positioned between the platens together with a concentric metal spacer ring 56 which has a length slightly less than that of the member 51. With application of clamping pressure the platens 53 and 54 are moved to a position where they engage the ends of the spacer 56, thus compressing the member 51 a predetermined amount. Assuming that the platens 53 and 54 are heated to a suitable curing temperature, the side portions of the members 51 are likewise heated together with the rubber stock, thereby curing and bonding the rubber to the adjacent surfaces defining the recesses. During this curing operation, the rubber is under some pressure and this is sufficient to cause discharge of trapped air and some extrusion through the small opening 52. The presence of such extruded material at the end of the curing operation is an indication of a proper molding operation, with elimination of air pockets or voids within the recesses. In addition, such extruded material serves as an added anchorage for the inserts within the recesses.

Figure 9:
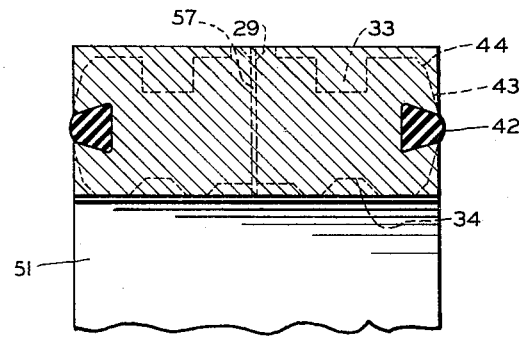
FIGURE 9 is a view like FIGURE 6, but indicating machining operations after the molding operation.
Figure 10:
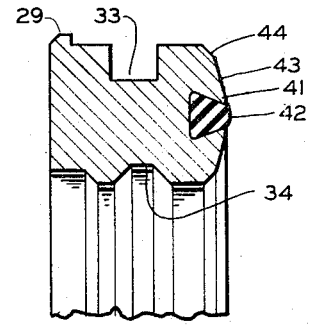
FIGURE 10 is a detail in section showing one of the seal members after machining operations thereon indicated by dotted lines in FIGURE 9.
Figure 11:
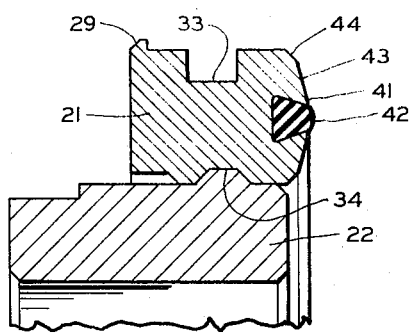
FIGURE 11 is a detail in section illustrating the seal member of FIGURE 10, applied upon metal carrier ringg.

After completing the curing operation, the member 51 is subjected to a series of machining operations indicated by dotted lines in FIGURE 9. These machining operations serve to form the flange portions 29, the O-ring retaining recesses or grooves 33, the end surfaces 43, the beveled corners 44, and the groove or recess 34. Finally a suitable tool is used to sever the member 51 into two identical parts, the severance being indicated by the double dotted line 57. After severance each part appears as in FIGURE 10. Either before or after severing the two parts, the side faces are machined whereby the exterior surface 42 of the rubber extends slightly beyond the adjacent end faces of the lip 41. The carrier ring 22 is now incorporated with the seal member 21 in the manner previously described.

I claim:

1. In a method for the manufacture of seal rings for valves from two different resilient materials, one of which is relatively hard and wear resistant compared to the other, the steps of introducing a heat curable stock of softer resilient material into a circumferential recess formed in one side portion of a ring formed of the harder material, applying a platen against said side portion of the ring whereby surfaces of the recess and surfaces of the platen define a closed cavity within which said softer material is compressed, and then curing the softer material by heat supplied from the platen.

2. A method as in claim 1 in which the harder material is nylon, and the softer material is a resilient synthetic rubber.

3. A method as in claim 1 in which the ring after said molding operation is machined to form a finished seal member, said machining including cutting away portions of the harder material to relieve the same relative to the exposed surface of the softer resilient material.

4. A method as in claim 1 in which said ring is dimensioned to form two like seal members, and in which said curable stock of softer material is introduced into recesses formed in both side portions of the ring, both sides of said ring being engaged with platens which are heated to cure both said inserts simultaneously.

5. In a method for the manufacture of resilient annular seal members from two different materials, one of which is nylon and the other of which is softer and more resilient than nylon, the steps of providing a circumferential recess in each side portion of a nylon ring, introducing heat curable stock of the softer material into both said recesses, applying platens against the sides of the nylon ring and applying force against the ring to compress said ring a predetermined amount and to enclose the stock within the recesses, curing the stock by heat supplied from said platens, and then machining said ring to form two duplicate annular seal members, said machining including cutting back the side faces of the nylon ring to expose the softer material for sealing contact with a valve working surface, and also machining of the nylon ring to sever the same into two seal members.

6. A method for the manufacture of seal rings for valves making use of apparatus comprising a pair of opposed platens, at least one of said platens being adapted to be heated, and a separate rigid spacer ring disposed between said platens serving to limit the minimum distance between the same, the method comprising introducing a heat curable stock of resilient material into a circumferential recess formed in one side portion of a ring formed of nylon, nesting the nylon ring with the spacer ring, positioning the nested nylon and rigid rings between the platens, applying force to urge the platens against the rigid ring to effect limited compression of the nylon ring, and curing the stock by heating at least one platen while the platens are being forced against the rigid ring with limited compression of the nylon ring.

References Cited by the Examiner

UNITED STATES PATENTS

| 1,764,009 | 6/1930 | Embree | 264—249 |
| 2,232,216 | 2/1941 | Daly | 264—157 |
| 2,452,577 | 11/1948 | Kotterman | 264—267 |
| 2,789,616 | 4/1957 | Cuthbertson et al. | 264—248 |
| 2,815,187 | 12/1957 | Hamer | 251—327 X |
| 2,905,197 | 9/1959 | Janis | 251—174 X |
| 2,985,422 | 5/1961 | Anderson | 251—172 |
| 3,033,517 | 5/1962 | Rovong | 251—328 X |
| 3,079,645 | 3/1963 | Cosmos | 264—259 |
| 3,132,837 | 5/1964 | Britton | 251—172 |

ROBERT F. WHITE, *Primary Examiner.*

ISADOR WEIL, *Examiner.*

C. GORDON, S. A. HELLER, *Assistant Examiners.*